United States Patent
Chen et al.

(10) Patent No.: US 11,457,453 B2
(45) Date of Patent: Sep. 27, 2022

(54) OUTER-LOOP ADJUSTMENT FOR LINK ADAPTATION

(71) Applicant: Telefonaktiebolaget LM Ericsson (publ), Stockholm (SE)

(72) Inventors: Xixian Chen, Ottawa (CA); Chandra Sekhar Bontu, Nepean (CA); Jianguo Long, Kanata (CA); James Jianfeng Weng, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 16/306,035

(22) PCT Filed: Jun. 7, 2016

(86) PCT No.: PCT/IB2016/053338
§ 371 (c)(1),
(2) Date: Nov. 30, 2018

(87) PCT Pub. No.: WO2017/212312
PCT Pub. Date: Dec. 14, 2017

(65) Prior Publication Data
US 2019/0297630 A1    Sep. 26, 2019

(51) Int. Cl.
*H04W 72/08* (2009.01)
*H04L 1/00* (2006.01)
(Continued)

(52) U.S. Cl.
CPC ......... *H04W 72/082* (2013.01); *H04L 1/0009* (2013.01); *H04L 1/0015* (2013.01);
(Continued)

(58) Field of Classification Search
CPC ... H04L 1/0009; H04L 1/0002; H04L 1/0015; H04L 1/0026; H04L 1/0033;
(Continued)

(56) References Cited

U.S. PATENT DOCUMENTS

| 2010/0195594 A1 | 8/2010 | Seo et al. |
| 2010/0284454 A1 | 11/2010 | Oteri et al. |

(Continued)

FOREIGN PATENT DOCUMENTS

| WO | 2014/047773 A1 | 4/2014 |
| WO | 2014/047815 A1 | 4/2014 |

(Continued)

OTHER PUBLICATIONS

International Search Report and Written Opinion dated Feb. 27, 2017 issued in corresponding PCT Application No. PCT/IB2016/053338, consisting of 12 pages.
3GPP TS 36.213 V11.4.0 (Sep. 2013) 3rd Generation Partnership Project; Technical Specification Group Radio Access Network; Evolved Universal Terrestrial Radio Access (E-UTRA); Physical Layer Procedures (Release 11), consisting of 182 pages.

*Primary Examiner* — Yemane Mesfin
*Assistant Examiner* — Mon Cheri S Davenport
(74) *Attorney, Agent, or Firm* — Sage Patent Group

(57) ABSTRACT

A method and system for performing link adaptation are disclosed. According to one aspect, a method in a wireless communication system for performing link adaptation is provided. The method includes, when a first measure of channel quality is higher than a first predetermined amount, using a first outer loop adjustment process directed to determining link adaptation for a first data transmission transmitted to a wireless device. The method also includes, when the first measure of channel quality is lower than a second predetermined amount, using a second outer loop adjustment process different from the first outer loop adjustment process directed to determining link adaptation for a second data transmission transmitted to the wireless device.

26 Claims, 7 Drawing Sheets

(51) Int. Cl.
*H04L 1/18* (2006.01)
*H04L 1/20* (2006.01)
*H04L 5/00* (2006.01)
*H04W 52/12* (2009.01)

(52) U.S. Cl.
CPC .......... *H04L 1/0026* (2013.01); *H04L 1/0033* (2013.01); *H04L 1/1812* (2013.01); *H04L 1/1893* (2013.01); *H04L 1/1896* (2013.01); *H04L 1/20* (2013.01); *H04L 5/0085* (2013.01); *H04W 52/12* (2013.01); *H04W 72/085* (2013.01); *H04L 5/005* (2013.01)

(58) Field of Classification Search
CPC ..... H04L 1/1812; H04L 1/1896; H04L 5/005; H04L 5/0085; H04B 7/0413; H04W 24/10; H04W 72/02; H04W 52/12; H04W 72/082; H04W 72/085
See application file for complete search history.

(56) References Cited

U.S. PATENT DOCUMENTS

| | | |
|---|---|---|
| 2011/0080968 A1 | 4/2011 | Seo et al. |
| 2012/0257664 A1 | 10/2012 | Yue et al. |
| 2013/0180469 A1 | 7/2013 | Yu et al. |
| 2014/0126467 A1* | 5/2014 | Lu .................. H04L 1/1867 370/328 |
| 2014/0133317 A1* | 5/2014 | Chen .................. H04B 7/0413 370/252 |
| 2014/0369283 A1 | 12/2014 | Ge et al. |

FOREIGN PATENT DOCUMENTS

| | | |
|---|---|---|
| WO | 2014/205644 A1 | 12/2014 |
| WO | 2015/018073 A1 | 2/2015 |

* cited by examiner

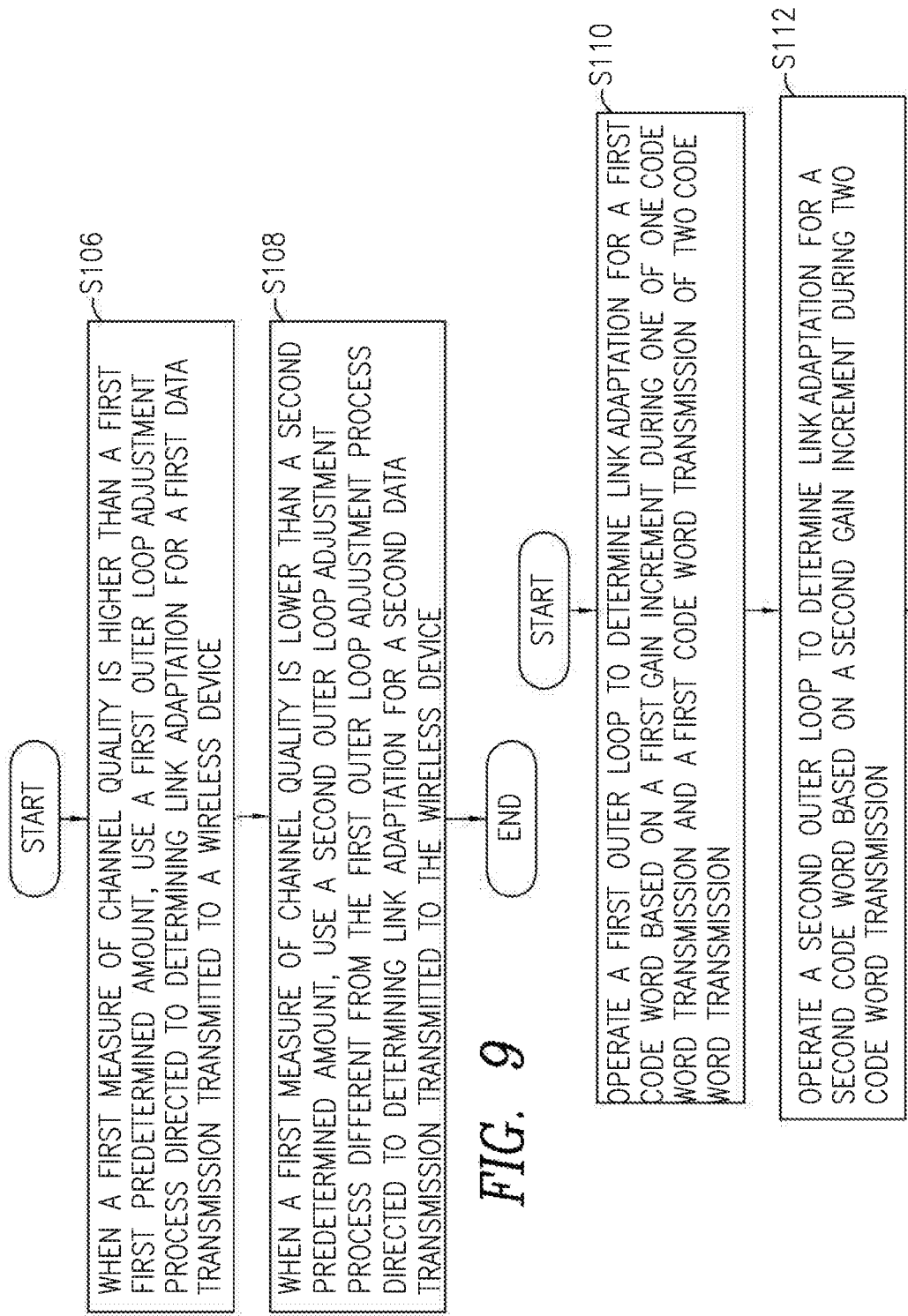

OUTER-LOOP ADJUSTMENT FOR LINK ADAPTATION

CROSS-REFERENCE TO RELATED APPLICATIONS

This application is a Submission Under 35 U.S.C. § 371 for U.S. National Stage Patent Application of International Application Number: PCT/M2016/053338, filed Jun. 7, 2016 entitled "OUTER-LOOP ADJUSTMENT FOR LINK ADAPTATION," the entirety of which is incorporated herein by reference.

TECHNICAL FIELD

Methods and devices are provided for wireless communication and in particular, for outer loop adjustment for link adaptation.

BACKGROUND

In a typical wireless communication system, wireless devices communicate via a radio access network (RAN) with other wireless devices and core networks. FIG. 1 is a block diagram of such a typical wireless communication system 10 including a core network 12, multiple base stations 14 and multiple wireless devices 16. The core network 12 may include intermediary devices such as a mobile management entity (MME) or serving gateway (S-GW). The core network provides connections to external networks such as the Internet and the Public Switched Telephone Network (PSTN). The base stations 14 may cover different geographic regions called cells which may overlap. Thus, a wireless device 16 may communicate over the air, i.e., wirelessly, with one or more base stations to communicate voice and data between the wireless device 16 and another wireless device, a landline telephone and/or the Internet. Using wireless communication standards such as the 3rd Generation Partnership Project (3GPP) Long Term Evolution (LTE) standards, the base stations 14 may communicate with each other over an X2 interface and communicate with the core network 12 over an S1 interface.

The term wireless device or mobile terminal used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dangle, etc.

The term base station, e.g. a Radio Base Station (RBS), sometimes may be referred to herein as, e.g., evolved. NodeB "eNB", "eNodeB", "NodeB", "B node", or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. In the context of this disclosure, downlink (DL) refers to the transmission path from the base station 14 to the wireless device 16. Uplink (UL) refers to the transmission path in the opposite direction, i.e., from the wireless device 16 to the base station 14.

In 3GPP LTE, base stations 14 may be directly connected to one or more core networks 12. Further, although embodiments are described with reference to base stations 14, it is understood that embodiments can be implemented in or across any suitable network node, of which base stations are a type.

Typically, wireless communication channels (also referred to herein as "wireless channels" for the sake of simplicity) over the air change with time due to a variety of causes such as motion of the wireless device 16 and changing environmental conditions. In order to maximize throughput of a wireless channel, a transmitter and/or a receiver can estimate the wireless channel characteristics and adapt the transmission and/or reception of signals to account for changes in the wireless channel. Link adaptation refers to the use of adaptive modulation and coding (AMC) to match the modulation, coding and other signal and protocol parameters to the conditions on the wireless channel (e.g. the path loss, the interference due to signals coming from other transmitters, the sensitivity of the receiver, the available transmitter power margin, etc.). Stated differently, link adaptation uses a rate adaptation algorithm that adapts the modulation and coding scheme (MCS) that is used for a particular transmission according to the quality of the wireless channel.

Link Adaptation (LA) is a Radio Resource Management (RRM) function in wireless communication systems used to provide reliable communication. The purpose of link adaptation is to determine the appropriate modulation and coding scheme (MCS) to maximize user throughput or data rate. In a typical system which utilizes Hybrid Automatic Repeat Request (HARQ), the task of link adaptation is to determine the highest MCS for which the targeted operating point, e.g., block error rate (BLER), can be achieved. To perform link adaptation, information on the communication link quality is required. This may be obtained either from measurements at the base station or reports of Channel State Information (CSI) from the wireless device to the base station.

The downlink (DL) link quality can be determined from reported CSI from the wireless device 16. The methodology of evaluating link quality is not defined by 3GPP standards, and thus the methodology varies between different wireless device vendors. One type of wireless device 16 may report an optimistic CSI while another type of wireless device 16 may report a pessimistic CSI. The CSI reported by a wireless device 16 is typically mapped to a channel quality measurement by the base station, for example signal to interference and noise ratio (SINR). In order to achieve the target BLER, a control loop can be introduced, henceforth called an outer-loop, which makes additional adjustments to the channel quality measurement obtained from the reported CSI based on transmission successes and failures. For example, SINR may be increased by an upward step when a transmission for a transport block (TB) is successful while it may be decreased by a downward step when a transmission for a TB fails. The ratio between upward and downward adjustment steps is determined based on the target BLER. For example, one downward step is set to nine upward steps with a target BLER of 10%.

In LIT multiple input/multiple output (MIMO) systems, two code words can be independently transmitted on two or more transmit antennas over the same radio resources by mapping the code words on to two or more transmission layers. For example, in LTE open-loop spatial multiplexing, also referred to as Transmission Mode 3 (TM3), when the channel conditions support multiple rank transmission, two code words can be transmitted using large delay cyclic delay diversity (CDD) over two layers. At the wireless device 16, the two code words can be detected by receiving the signal using multiple receive antennas. For two code word MIMO data transmission, the latest CSI report from the wireless device 16 should indicate a rank of at least two, meaning that at least two layers are available to the wireless device 16. In the rest of this document, TM3 is used as an example; however, in general the presented methods and apparatuses are equally applicable to any MIMO transceiver mechanisms.

FIG. 2 is a block diagram of a base station 14 and a wireless device 16 illustrating known data decoding and channel measurements performed by the wireless device 16 and a single outer loop (OL) adjustment (OLA) 20 and link adaptation 22 performed by the base station 14. In operation, the wireless device 16 receives one or more code words on the downlink from the base station 14. When the wireless device 16 receives the code words affected by the wireless channel, a decoder and channel measurement subsystem 18 of the wireless device 16 first uses DL reference signals to derive a measure of the wireless channel and then uses the channel measurement to decode the received code words.

Channel state information based on the channel measurement is transmitted to the base station 14 where it is mapped to a signal to interference plus noise ratio (SINR) by a mapper 24. The SINR is sent to the OLA unit 20 which derives therefrom a gain to interference plus noise ratio (GINR) by subtracting a power spectrum density (PSD) of the reference signal. The GINR is then updated according to whether the code words were successfully decoded by the wireless device 16. The GINR may be filtered to smooth the GINR to follow slow fading before performing outer loop adjustment. When the wireless device 16 can successfully decode the code words, the wireless device 16 sends an acknowledgement (ACK) signal to the OLA unit 20 of the base station 14. When the wireless device 16 cannot successfully decode the code words, the wireless device 16 sends a negative acknowledgement (NACK) signal to the OLA unit 20 of the base station 14.

When the OLA unit 20 receives an ACK signal, the OLA unit 20 increments the computed GINR. When the OLA unit 20 receives a NACK signal, the OLA unit 20 decrements the computed GINR. The GINR adjusted by the OLA unit 20 is used by the channel quality calculator unit 26 to calculate link qualities for each modulation mode (quadrature phase shift keying (QPSK), 16 quadrature amplitude modulation (QAM), 64 QAM and 256 QAM). The link qualities are used by the DL scheduling and link adaptation unit 22 to find the smallest allowable number of scheduling blocks and the corresponding MCS that should be used to achieve a desired BLER.

Typically the transmission parameters, such as the modulation and coding scheme (MCS), the number of scheduling blocks (SBs), etc., are determined by the base station 14 at every transmission instant (every transmission time interval (TTI) or multiple TTIs) for future downlink (DL) transmissions based on the receiver performance feedback information received from the wireless device. In the case of TM3, there is one common Channel Quality Indicator (CQI) feedback for both the code words transmitted. However, the hybrid automated repeat request (HARQ) feedback of each code word (i.e. ACK/NACK feedback) is transmitted over a physical uplink control channel (PUCCH) or a physical unlink shared channel (PUSCH) (based on the UE category and the feedback setting) separately.

In one example, the base station may only maintain one outer loop for both one code word and two code word transmissions. In this example, the same link adaptation result (MCS and number of scheduling blocks (SB)) is applied to both code words. The GINR for the single outer loop is incremented according to the following:

GinrAdj=GinrAdj+GinrUpStep, if HARQ feedback is ACK

GinrAdj=GinrAdj GinrDownStep, if HARQ feedback is NACK

Using the same outer loop for both code word transmissions works well if the SINR is the same for each for both code words. However, in some circumstances, this assumption may be incorrect and may cause degradation in throughput, especially at higher data rates, where the cell specific reference signal (CRS) interferences from neighbor cells are dominant.

In another example, the base station 14 may maintain individual outer loops for each possible transmission scenarios. An advantage of the individual outer loop example is the ability to track different channel conditions experienced in the transmission of each code word for either one code word or two code word transmission. Drawbacks of this example is that when any of the outer loop adjustment values become stale, as in the case of rapidly varying wireless channels, the wireless device may experience call drop or throughput degradation at low SINK.

SUMMARY

Some embodiments advantageously provide a method and network node for performing link adaptation. According to one aspect, a method in a wireless communication system for performing link adaptation is provided. The method includes, when a first measure of channel quality is higher than a first predetermined amount, using a first outer loop adjustment process directed to determining link adaptation for a first data transmission transmitted to a wireless device. The method further includes, when the first measure of channel quality is lower than a second predetermined amount, using a second outer loop adjustment process different from the first outer loop adjustment process directed to determining link adaptation for a second data transmission transmitted to the wireless device.

According to this aspect, in some embodiments, the first predetermined amount is a threshold plus a hysteresis value and the second predetermined amount is the threshold minus the hysteresis value. In some embodiments, the second outer loop adjustment process converges faster than the first outer loop adjustment process. In some embodiments, the first data transmission is one code word and the first outer loop adjustment process uses a first increment to adjust a gain to interference plus noise ratio, GINR. In some embodiments, the first data transmission is two code words and the first outer loop adjustment process uses a first increment to adjust a first GINR, and uses a second increment to adjust a second GINR. In some embodiments, the first data transmission is N code words, N being an integer greater than 2, and the first outer loop adjustment process uses a different increment to adjust a gain to interference plus noise ratio for each of the N code words. In some embodiments, the first outer loop adjustment process comprises three loops and includes in a first loop used for the first data transmission, when the first data transmission is a one code word transmission, determining an amount of a first increment to be applied to a first GINR corresponding; to the one code word transmission. The first outer loop adjustment process also includes determining based at least in part on the first GINR, at least one of a modulation and coding level to apply to the one code word. In a second loop and a third loop used for the first data transmission, when the first data transmission is a two code word transmission, the method includes determining an amount of a second increment to be applied to a second GINR corresponding to a first of the two code words, determining based at least in part on the second GINR, at least one of a modulation and coding level to apply to the first of the two code words, determining an amount of a third increment to be applied to a third GINR corresponding to a second of the two code words, and determining based at least in part on the third GINR, at least one of a modulation and coding level to apply to the second of the two code words. In some embodiments, when the first increment is not updated for a predetermined period of time, the first increment is updated with an average of the second and third increments. In some embodiments, when the second and third increments are not updated for a predetermined period of time, the second and third increments are updated with the first increment. In some embodiments, the second outer loop adjustment process comprises a single loop and includes, when the second data transmission is one of a one code word and two code word transmission determining an amount of an increment to be applied to a GINR and determining based at least in part on the GINR, at least one of a modulation and coding level to apply to the second data transmission.

According to another aspect, a network node configured to perform link adaptation is provided. In some embodiments, the network node includes processing circuitry including a memory and a processor. The memory is configured to store a channel quality measure, gain increment values, and a hysteresis value. The processor is configured to compare the channel quality measure to a first predetermined amount. When the channel quality measure is greater than the first predetermined amount, the processor performs a first outer loop adjustment process, the first outer loop adjustment process directed to determining link adaptation for a first data transmission transmitted to a wireless device. When the channel quality measure is less than a second predetermined amount, the processor performs a second outer loop adjustment process, the second outer loop adjustment process directed to determining link adaptation for a second data transmission to the wireless device.

According to this aspect, in some embodiments, the first predetermined amount is a threshold plus the hysteresis value and the second predetermined amount is the threshold minus the hysteresis value. In some embodiments, the second outer loop adjustment process converges faster than the first outer loop adjustment process. In some embodiments, the first data transmission is one code word and the first outer loop adjustment process uses a first increment to adjust a GINR. In some embodiments, the first data transmission is two code words and the first outer loop adjustment process uses a first increment to adjust a first GINR, and uses a second increment to adjust a second GINR. In some embodiments, the first data transmission is N code words, N being an integer greater than 2, the first outer loop adjustment process using a different increment to adjust a gain to interference plus noise ratio for each of the N code words. In some embodiments, the first outer loop adjustment process comprises three loops, which includes, in a first loop used when the first data transmission is a one code word transmission, determining an amount of a first increment to be applied to a first GINR corresponding to one code word transmission, and determining based at least in part on the first GINR, at least one of a modulation and coding level to apply to the one code word. In a second loop and a third loop used when the first data transmission is a two code word transmission, the processor is configured to determine an amount of a second increment to be applied to a second GINR corresponding to a first of the two code words, and to determine based at least in part on the second GINR, at least one of a modulation and coding level to apply to the first of the two code words. The processor is also configured to determine an amount of a third increment to be applied to a third GINR corresponding to a second of the two code words, and to determine based at least in part on the third GINR, at least one of a modulation and coding level to apply to the second of the two code words. In some embodiments, when the first increment is not updated for a predetermined period of time, the first increment is updated with an average of the second and third increments. In some embodiments, when the second and third increments are not updated for a predetermined period of time, the second and third increments are updated with the first increment. In some embodiments, the second outer loop adjustment process comprises a single loop and includes, when the second data transmission is one of a one code word and two code word transmission, determining an amount of an increment to be applied to a gain to interference plus noise ratio, GINR, and determining based at least in part on the GINR, at least one of a modulation and coding level to apply to the second data transmission.

According to yet another aspect, a method in a wireless communication system for performing link adaptation is provided. The method includes operating a first outer loop to determine link adaptation for a first code word based on a first gain increment during one of one code word transmission and a first code word transmission of a two code word transmission. The method also includes operating a second outer loop to determine link adaptation for a second code word based on a second gain increment during two code word transmission.

According to this aspect, in some embodiments, the first outer loop converges faster than the second outer loop. In some embodiments, the method further includes incrementing a first GINR by the first gain increment and determining based at least in part on the incremented first GINR at least one of a modulation and coding level to apply to data to be transmitted on a first code word In some embodiments, the method further includes incrementing a second GINR by the second gain increment and determining based at least in part on the incremented second GINR at least one of a modulation and coding level to apply to data to be transmitted on a second code word. In some embodiments, adjustment in the first outer loop is based on hybrid automatic repeat request, HARQ, feedback for the first code word during one of one and two code word transmissions and adjustment in the second outer loop is based on HARQ feedback for the second code word during two code word transmissions. In some embodiments, the first gain increment is selected to track channel conditions for both one code word and two code word transmissions when a signal to interference plus noise, SINR, is less than a threshold.

According to another aspect, a network node configured to perform link adaptation is provided. The network node includes processing circuitry including a memory and a processor. The memory is configured to store gain increment values. The processor is configured to operate a first outer loop to determine link adaptation for a first code word in a first loop based on a first gain increment during one of one code word transmission and a first code word transmission of a two code word transmission. The processor is further configured to operate a second outer loop to determine link adaptation for a second code word in a second loop based on a second gain increment during two code word transmission.

According to this aspect, in some embodiments, the first outer loop converges faster than the second outer loop. In some embodiments, the processor is further configured to increment a first GINR by the first gain increment and determine based at least in part on the incremented first GINR at least one of a modulation and coding level to apply to data to be transmitted on a first code word. In some embodiments, the processor is further configured to increment a second GINR by the second gain increment and determine based at least in part on the incremented second GINR at least one of a modulation and coding level to apply to data to be transmitted on a second code word. In some embodiments, adjustment in the first outer loop is based on hybrid automatic repeat request, HARQ, feedback for the first code word during one of one and two code word transmission and adjustment in the second outer loop is based on HARQ feedback for the second code word during two code word transmission. In some embodiments, the first gain increment is selected to track channel conditions for both one code word and two code word transmissions when a signal to interference plus noise, SINR, is below a predetermined threshold.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart of an exemplary process for performing outer loop adjustment; and FIG. 10 is a flowchart of another exemplary process for performing outer loop adjustment.

DETAILED DESCRIPTION

Figure 1:
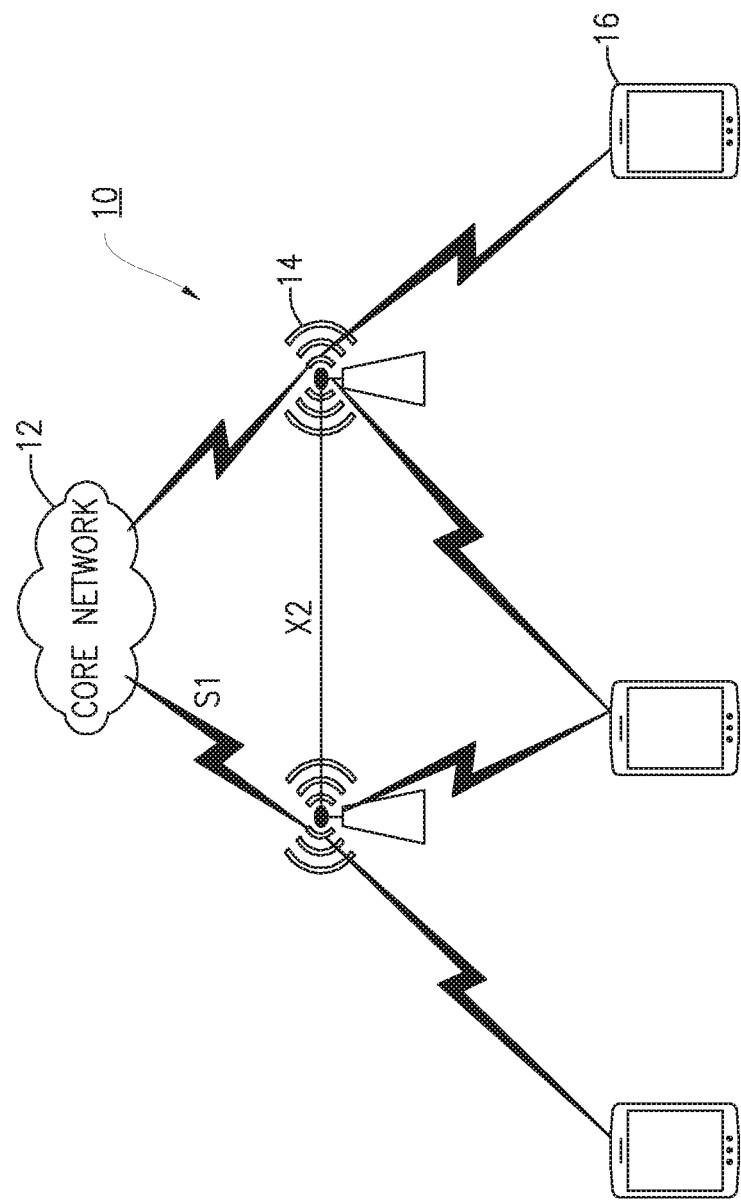
FIG. 1 is a block diagram of an exemplary wireless communication system including a core network, multiple base stations and multiple wireless devices.
Figure 2:
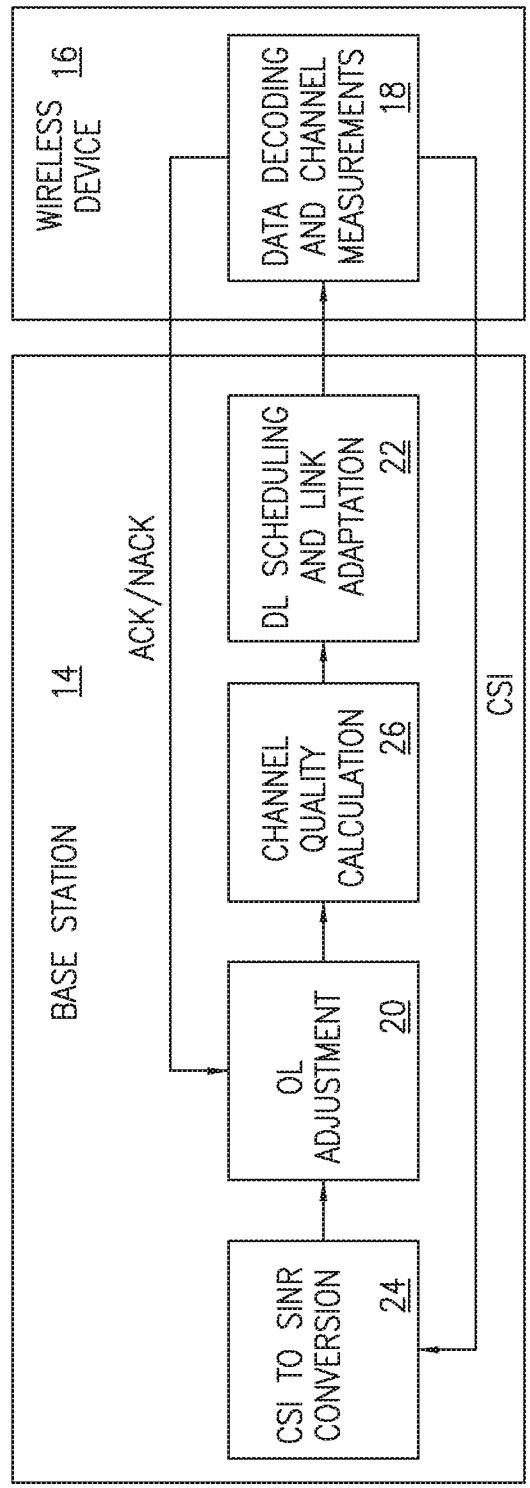
FIG. 2 is a block diagram of an exemplary base station and an exemplary wireless device illustrating the data decoding and channel measurements performed by the wireless device and the outer loop (OL) adjustment (OLA) and link adaptation performed by the base station.

Before describing in detail exemplary embodiments, it is noted that the embodiments reside primarily in combinations of apparatus components and processing steps related to outer loop adjustment for link adaptation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, improved downlink (DL) performance as compared with known solutions is achieved by improving the outer loop adjustment processes. In some embodiments, at high SINR, three outer loops are operated, and at low SINR, only one outer loop is operated.

In other embodiments, a two outer loop process may be implemented. A first increment is used in one loop for a first code word link adaptation when one or two code words are transmitted. A second increment is used in a second loop for a second code word link adaptation when two code words are transmitted.

At high SINR, two code words may experience different levels of interference due to non-shifted cell specific reference signal (CRS). A different increment for each code word can effectively compensate the link for the two code words, separately. At low SINR, both code words may statistically experience the same level of interference, and so one outer loop may be more effective to track rapidly changing channel conditions.

Figure 3:
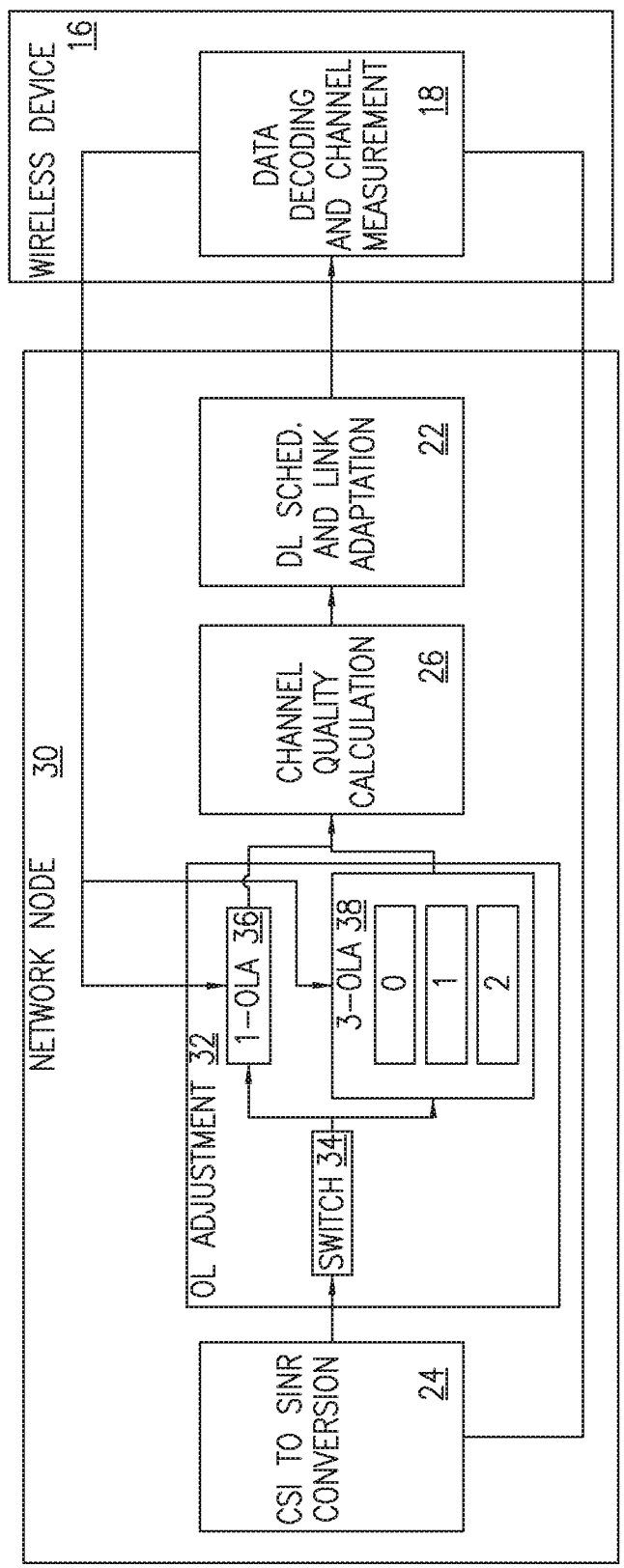
FIG. 3 is a block diagram of an embodiment for outer loop adjustment switching within an OLA unit within a network node.

FIG. 3 is a block diagram of an embodiment for outer loop adjustment switching within an OLA unit 32 within a network node 30. In one embodiment, the network node 30 may be a base station and the functionality of OLA unit 32 may be in the base station. In another embodiment, the OLA unit 32 may be in a network node 30 other than a base station. The OLA unit 32 includes a switch 34, a first OLA process 36 and a second OLA process 38. The switch 34 can be implemented by hardware such as a processor, and selects one of the OLA process 36 and the OLA process 38 depending on an estimated SINR. The first OLA process 36 is a single loop process and the second OLA process 38 is a three loop process. When the wireless device first attaches to the network node 30, the first OLA process 36 may be used. In this case, the network node 30 uses one outer loop adjustment value to perform link adaptation for both one code word transmissions and two code word transmissions. This means that the MCS, for example, is the same for both code words of a two code word transmission, even though each code word may experience different channel qualities. The incrementing of the GINR for the single outer loop is as follows:

GinrAdj=GinrAdj GinrUpStep, if HARQ feedback is ACK

GinrAdj=GinrAdj−GinrDownStep, if HARQ feedback is NACK

MCS is determined based on the adjusted GINR and is used for one code word or two code words.

After some time, if the estimated SINR that is based on the CSI from the wireless device 16 plus outer loop adjustment is above a threshold, SinrThr, plus a hysteresis value, the three loop outer loop adjustment process 38 is used. A purpose of the hysteresis value is to prevent a ping pong effect of rapid switching between OLA processes 36 and 38 such as might otherwise occur due to changing channel conditions. In this case, a first set of increments is used for one code word link adaptation and second and third set of increments are used for each of two code words for two code word link adaptation. In one embodiment, when the first increment is not updated for a predetermined period of time, the first increment is updated with an average of the second and third increments. In another embodiment, when the second and third increments are not updated for a predetermined period of time, the second and third increments are updated with the first increment. In one embodiment, each set has a first increment to increase the GINR and a second increment to decrease the GINR, as follows:

Loop 1
GinrAdjOneCw=GinrAdjOneCw+GinrUpStep, if HARQ feedback for one code word transmission is ACK
GinrAdjOneCw=GinrAdjOneCw+GinrDownStep, if HARQ feedback for one code word transmission is NACK Loop 2
GinrAdjTwoCw0=GinrAdjTwoCw0+GinrUpStep, if HARQ feedback for two code word transmission (code word 0) is ACK
GinrAdjTwoCw0=GinrAdjTwoCw0−GinrDownStep, if HARQ feedback for two code word transmission (code word 0) is NACK Loop 3
GinrAdjTwoCw1=GinrAdjTwoCw1+GinrUpStep, if HARQ feedback for two code word transmission (code word 1) is ACK
GinrAdjTwoCw1=GinrAdjTwoCw1−GinrDownStep, if HARQ feedback for two code word transmission (code word 1) is NACK.

Each loop corresponds to a respective code word and increments a respective GINR. An MCS for each code word is determined based at least in part on the respective GINR. In particular, an MCS may be based on a GINR plus a power spectral density (PSD) for the respective code word.

In the three outer loop process, GinrAdjOneCw is used for one code word link adaptation, and GinrAdjTwoCw0 and GinrAdjTwoCw1 are used for two code word link adaptation. If GinrAdjOneCw becomes stale, i.e., not updated for a certain time, GinrAdjOneCw may be updated with GinrAdjTwoCw0 and GinrAdjTwoCw1, as follows:

GinrAdjOneCw=average(GinrAdjTwoCw0,GinrAdjTwoCw1) Similarly, if GinrAdjTwoCw0 and GinrAdjTwoCw1 become stale, GinrAdjTwoCw0 and GinrAdjTwoCw1 may be updated with GinrAdjOneCw, as follows:
GinrAdjTwoCw0=GinrAdjOneCw
GinrAdjTwoCw1=GinrAdjOneCw Subsequent to the initiation and operation of the three outer loop process 38, if the estimated SINR falls below the threshold SinrThr minus the hysteresis value, the outer loop adjustment process will be switched back to the single loop process 36. The estimated SINR (EstimatedSinr) used to determine which OLA process is selected by switch 34 and can be calculated for single loop OLA 36 as follows:

SINR=GINR+GinrAdjOneCw+PSD+10 log 10(rank); and
EstimatedSinr=ForgettingFactor(t)*SINR+(1−ForgettingFactor(t))*EstimatedSinr where the forgetting factor is inversely proportional to the time interval between the current and previous channel quality reports. The rank determines the number of code words used in the transmission to the wireless device.

For three loop OLA 38, the estimated SINR (EstimatedSinr) be calculated as follows:

SINR=GINR+GinrAdjOneCw+PSD, rank=1
SINR=GINR+Average(GinrAdjTwoCw0, GinrAdjTwoCw1)+PSD+10 log 10(rank), rank>1
EstimatedSinr=ForgettingFactor(t)*SINR+(1−ForgettingFactor(t))*EstimatedSinr The switch 34 operates to switch between the 1-OLA process 36 and the 3-OLA process 38 based on a hysteresis loop and a timing algorithm. If the current process is the 1-OLA process and the estimated SINR is greater than a threshold plus a hysteresis value, the process switches to the 3-OLA process and the increments are set as follows:

GinrAdjOneCw=GinrAdj
GinrAdjTwoCw0=GinrAdjOneCw
GinrAdjTwoCw1=GinrAdjOneCw

If the current process is the 3-OLA process and the estimated SINR is less than the threshold minus the hysteresis value, the process switches to the 1-OLA process and the increment is set as follows:

GinrAdj=GinrAdjOneCw, if rank=1
GinrAdj=average(GinrAdjTwoCw0, GinrAdjTwoCw1), if rank>1

Figure 4:
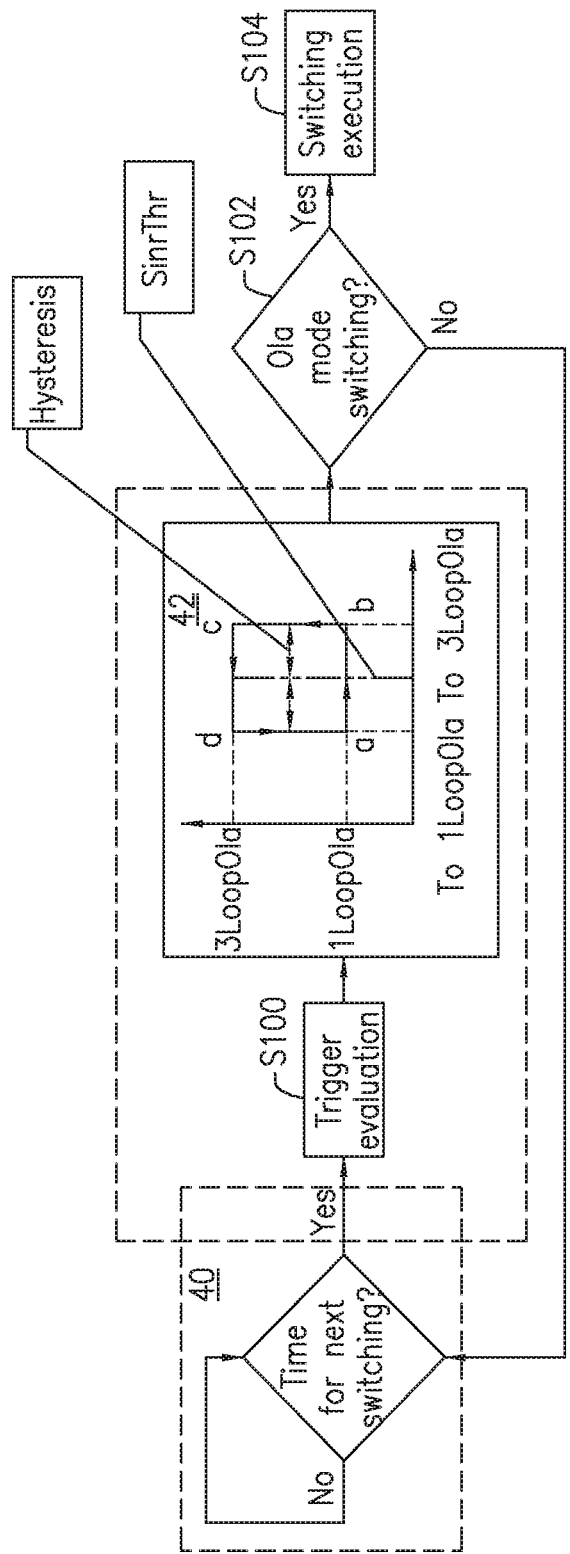
FIG. 4 is a switching process for outer loop adjustment switching according to one embodiment described herein.

FIG. 4 shows a switching process that may be implemented by the switch 34. As noted, the switch can be implemented by a processor or may be implemented as a physical hardware switch actuated by a processor. The process of FIG. 4 begins on the left with a timing loop 40 which determines whether it is time to switch between 1-OLA and 3-OLA. If so, the process proceeds to evaluating a switching trigger at block S100. The switching trigger evaluation is diagramed in block 42. Starting at point a, the base station 30 is operating in the 1-OLA process. Moving from point a to point h, as the estimated SINR increases above the threshold SinrThr plus the hysteresis value, at point b the OL adjustment unit 32 switches from the 1-OLA process to the 3-OLA process. Moving from point b to point c, the OLA unit 32 remains in the 3-OLA process. until the estimated SINR decreases below the threshold SinrThr minus the hysteresis value, when the process moves from point c to d. Accordingly, the OLA unit 32 switches from the 3-OLA process to the 1-OLA process. Thus, when OLA switching is to occur, as shown in block S102, the switching is executed (block S104). The use of the hysteresis value prevents a ping pong effect between the first and second OLA processes by providing a gap between the threshold for switching to the first OLA process and for switching to the second OLA process.

Thus, in some embodiments, OLA switching between a first OLA process and a second OLA occurs based on whether a measure of channel quality exceeds a first predetermined amount and whether a measure of channel quality falls below a second predetermined amount. In some embodiments, the first predetermined amount is a threshold plus a hysteresis value and the second predetermined amount is the threshold minus the hysteresis value. In each of the first OLA process and the second OLA process, a link adaptation is determined for data transmission to a wireless device. In the first OLA process, the data transmission may be one or two code words. If one code word, the first OLA process uses a first increment to adjust a GINR. A MCS is determined based at least in part on the adjusted GINR. If two code words, the first OLA process uses a first increment to adjust a first GINR, and uses a second increment to adjust a second GINR. A first MCS for the first code word is based at least in part on the adjusted first GINR and a second MCS for the second code word is based at least in part on the adjusted second GINR.

In some embodiments, the first data transmission may be N code words, where N is greater than 2. In the case of N code word transmission, in some embodiments, the first OLA process uses a different increment to adjust a GINR for each of the N code words. An MCS for each of the N code words is based at least in part on the adjusted different GINR for the respective code word.

In another embodiment, rather than switch between a first outer loop process and a second outer loop process based on SINR, two outer loops may be implemented to operate regardless of whether the SINR is high or low. In this embodiment, each loop has a set of increments as follows:

GinrAdjTwoCw0=GinrAdjTwoCw0+GinrUpStep, if HARQ feedback for one code word or two code word transmission (code word 0) is ACK GinrAdjTwoCw0=GinrAdjTwoCw0−GinrDownStep, if HARQ feedback for one code word or two code word transmission (code word 0) is NACK GinrAdjTwoCw1=GinrAdjTwoCw1+GinrUpStep, if HARQ feedback for two code word transmission (code word 1) is ACK GinrAdjTwoCw1=GinrAdjTwoCw1−GinrDownStep, if HARQ feedback for two code word transmission (code word 1) is NACK The increment GinrAdjTwoCw0 is used for a code word 0 link adaptation with one or two code word transmission, and the increment GinrAdjTwoCw1 is used only for code word 1 link adaptation with two code word transmission. At high SINR, these two increment values can effectively track different channel conditions for each code word. At low SINR, GinrAdjTwoCw0 can effectively track the fast channel condition changes for both one code word transmission and two code word transmission.

Thus, in another embodiment, a first outer loop and a second outer loop run concurrently without switching between processes. In the first outer loop, a first GINR is incremented by a first increment, and based on the incremented first GINR, at least one MCS level is applied to data to be transmitted on a first code word. Similarly, in the second outer loop, a second GINR is incremented by a second increment, and based on the incremented second GINR, at least one MCS level is applied to data to be transmitted on a second code word. The amount of the first increment is based on HARQ feedback for the first code word during one of one and two code word transmission, and may be further selected to track channel condition for both one and two code word transmissions at low SINR. The amount of the second increment is based on HARQ feedback for the second code word during two code word transmission.

Figure 5:
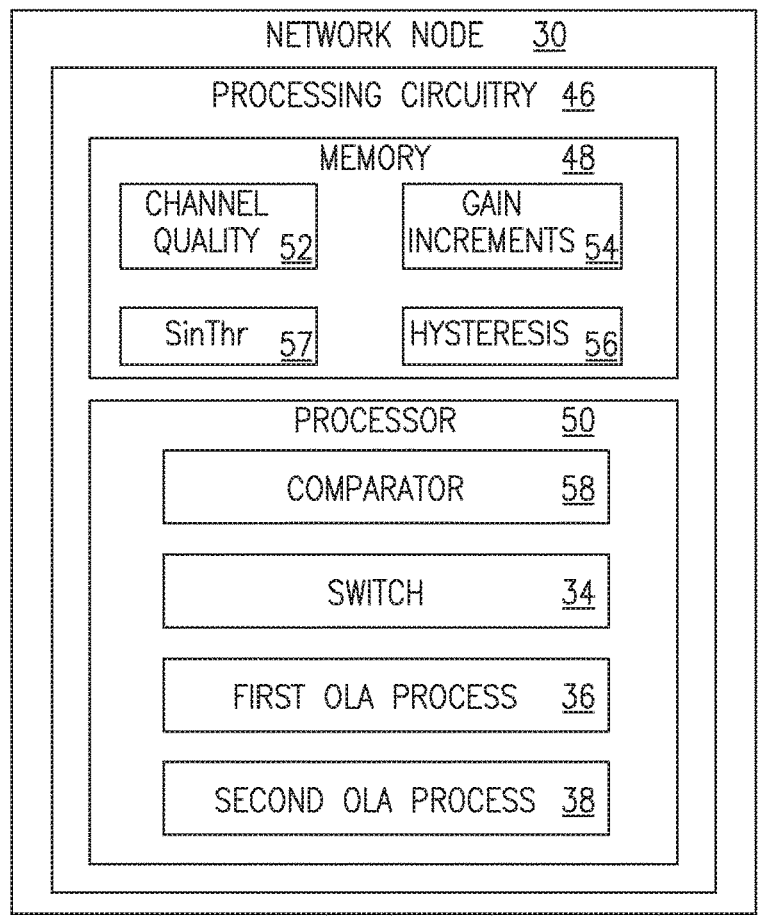
FIG. 5 is a block diagram of a network node configured to perform OLA for link adaptation that switches between two outer loop processes based on channel quality.

FIG. 5 is a block diagram of a network node 30 which, in one embodiment, can be a base station. In other embodiments, the functions of network node 30 can be distributed among several network nodes and/or base stations. The network node 30 has processing circuitry 46. In some embodiments, the processing circuitry 46 may include a memory 48 and processor 50, the memory 48 containing instructions which, when executed by the processor 50, configure the processor 50 to perform the one or more functions described herein. In addition to a traditional processor and memory, processing circuitry 46 may comprise integrated circuitry for processing and/or control, e.g., one or more processors and/or processor cores and/or FPGAs (Field Programmable Gate Array) and/or ASICs (Application Specific Integrated Circuitry).

Processing circuitry 46 may comprise and/or be connected to and/or be configured for accessing (e.g., writing to and/or reading from) memory 48, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 48 may be configured to store code executable by control circuitry and/or other data, e.g., data pertaining to communication, e.g., configuration and/or address data of nodes, etc. Processing circuitry 46 may be configured to control any of the methods described herein and/or to cause such methods to be performed, e.g., by processor 50. Corresponding instructions may be stored in the memory 48, which may be readable and/or readably connected to the processing circuitry 46. In other words, processing circuitry 46 may include a controller, which may comprise a microprocessor and/or microcontroller and/or FPGA (Field-Programmable Gate Array) device and/or ASIC (Application Specific Integrated Circuit) device. It may be considered that processing circuitry 46 includes or may be connected or connectable to memory, which may be configured to be accessible for reading and/or writing by the controller and/or processing circuitry 46. Note that the processing circuitry 46 may perform other functions of the network node 30 shown in FIG. 3.

The memory 48 is configured to store channel quality values 52 computed based on the feedback channel state information (CSI) converted to SINR and modified based on the feedback HARQ messages, ACK and HACK. The memory 48 also stores gain increments 54 to increment the GINR in each outer loop being processed. Also, the memory 48 stores a hysteresis value 56 and a threshold value 57 (e.g. SinThr) used in some embodiments to determine when to switch from an outer loop process corresponding to a low SINR condition to an outer loop process corresponding to a high SINR condition.

In some embodiments, the processor 50 includes a comparator 58 which is configured to compare an estimated SINR to a threshold value SinrThr 57 plus the hysteresis value 56 and to compare the estimated SINR to the threshold value SinrThr 57 minus the hysteresis value 56. The processor 50 also includes a switch 34 that switches between a first OLA process 36 and a second OLA process 38. Although the first OLA process shows only three loops, the number of loops may be proportional to or otherwise related to the number of code words transmitted when the number of code words is greater than two.

Figure 6:
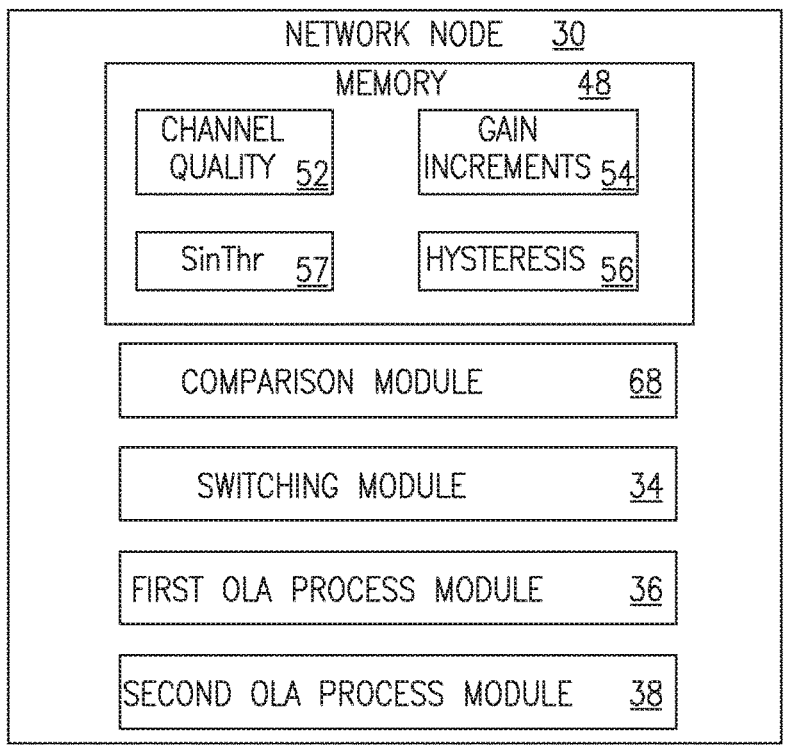
FIG. 6 is a block diagram of another network node configured to perform OLA for link adaptation that switches between two outer loop processes based on channel quality.

FIG. 6 is a block diagram of another embodiment of a network node 30 such as a base station configured to provide OLA for high SINR and low SINR. The network node 30 may include a memory module 48 configured to store channel quality 52, gain increments 54, hysteresis values 56 and a threshold value, SinrThr, 57. In some embodiments, the network node 30 includes a switching module 34 to switch between a first OLA process and a second OLA process based on an estimated SINR. In such embodiments, a comparison module 68 compares the estimated SINR to a threshold and a hysteresis value.

Figure 7:
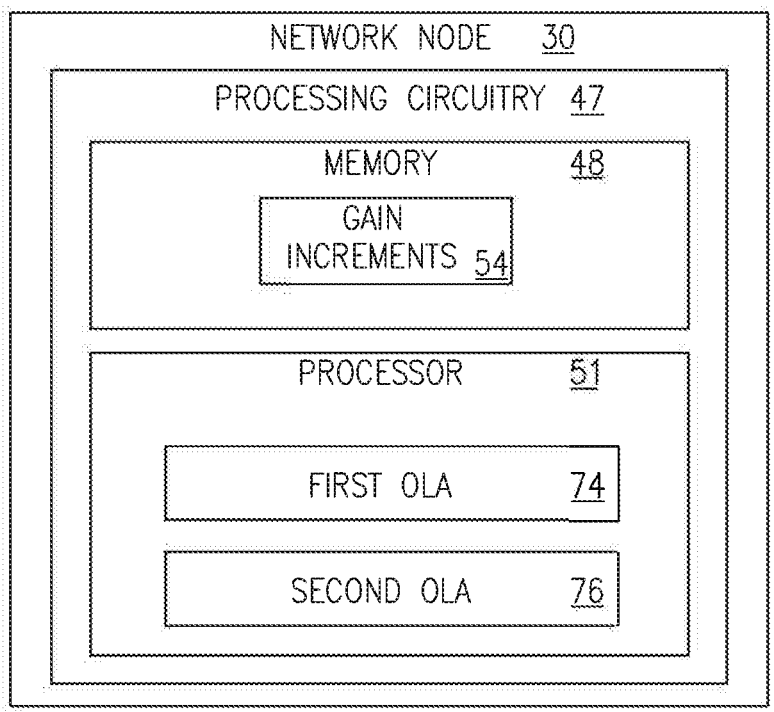
FIG. 7 is a block diagram of a network node with an outer loop adjustment process comprising two concurrently operated outer loops

In some other embodiments, there is no switching between OLA processes or comparison of estimated SINR in the processor 50. This is shown in FIG. 7. Instead, there is a single OLA process with a first outer loop 74 and a second outer loop 76 that operate concurrently, with a first increment in the first OLA process 74 corresponding to a first code word of one or two code word transmission and a second increment in the second OLA process 76 corresponding to a second code word of two code word transmission. At high SINR, these two increment values can effectively track different channel conditions for each code word. At low SINK, a first increment can effectively track the fast channel condition changes for both one code word transmission and two code word transmission. Thus, the network node 30 of FIG. 7 includes processing circuitry 47 that includes memory 48 that stores gain increments 54 and processor 51 which includes the first and second OLA processes. 74 and 76.

Figure 8:
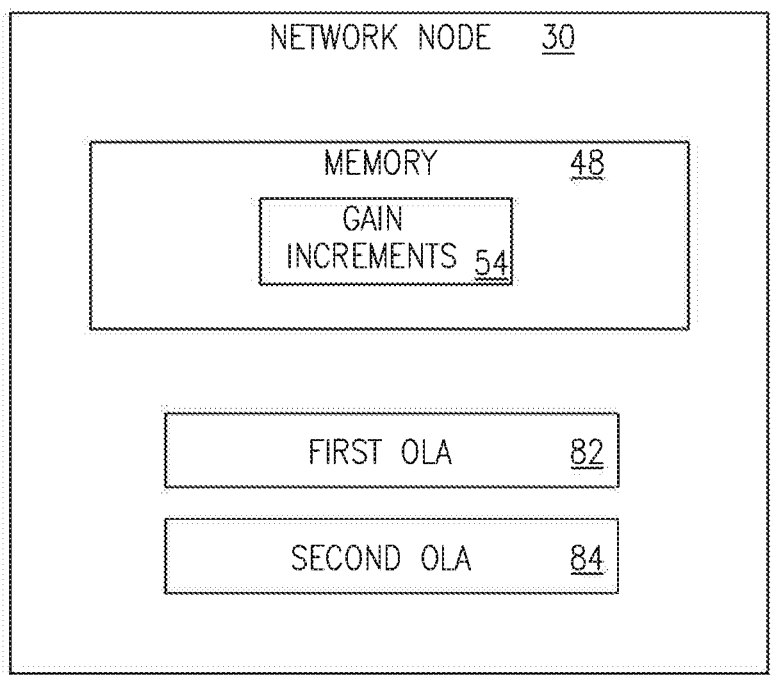
FIG. 8 is a block diagram of another network node with an outer loop adjustment process comprising two concurrently operated outer loops.

FIG. 8 is another embodiment of a network node 30 such as a base station configured to perform OLA with two loops as described with respect to FIG. 7. The first outer loop process 82 and the second outer loop process 84 operate concurrently, with a first increment in the first OLA process 82 corresponding to a first code word of one or two code word transmission and a second increment in the second OLA process 84 corresponding to two code word transmission. At high SINR, these two increment values can effectively track different channel conditions for each code word. At low SINR, a first increment can effectively track the fast channel condition changes for both one code word transmission and a second code word of two code word transmission. Note that a single device can be configured to include the modules of FIGS. 7 and 8.

FIG. 9 is a flowchart of an exemplary process for performing outer loop adjustment based on an estimated SINR. The process includes using a first outer loop adjustment process 36 directed to determining link adaptation for first data transmission to a wireless device 16 when a first measure of channel quality is higher than a first predetermined amount as determined by the comparator 58 (block S106). When the first measure of channel quality is lower than a second predetermined amount as determined by the comparator 58, a second outer loop adjustment process 38 is directed to determining link adaptation for a second data transmission to the wireless device 16 (block S108).

FIG. 10 is a flowchart of an exemplary process for performing outer loop adjustment without switching based on SINR, but configured to address low SINR. The process performed by processing circuitry 47 includes operating a first outer loop 74 of processor 51 to determine link adaptation for a first code word based on a first gain increment during one of one and two code word transmission (block S110). The process performed by processing circuitry 47 also includes operating a second outer loop 76 of processor 51 to determine link adaptation for a second code word based on a second gain increment during two code word transmission (block S112).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a wireless communication system for performing link adaptation, the method comprising:
when a first measure of channel quality is higher than a first predetermined amount, using a first outer loop adjustment process directed to determining link adaptation for a first data transmission transmitted to a wireless device, wherein the first outer loop adjustment process comprises three loops; and
when the first measure of channel quality is lower than a second predetermined amount, using a second outer loop adjustment process different from the first outer loop adjustment process directed to determining link adaptation for a second data transmission transmitted to the wireless device,
wherein the second outer loop adjustment process comprises a single loop, and
wherein the first data transmission is two code words and the first outer loop adjustment process uses a first increment to adjust a first gain to interference plus noise ratio (GINR) and uses a second increment to adjust a second GINR.

2. The method of claim 1, wherein the second outer loop adjustment process converges faster than the first outer loop adjustment process.

3. The method of claim 1, wherein the first data transmission is one code word and the first outer loop adjustment process uses a first increment to adjust a gain to interference plus noise ratio (GINR).

4. The method of claim 1, wherein the first data transmission is N code words, N being an integer greater than 2, the first outer loop adjustment process using a different increment to adjust a gain to interference plus noise ratio for each of the N code words.

5. The method of claim 1, wherein the first outer loop adjustment process includes:
in a first loop used for the first data transmission, when the first data transmission is a one code word transmission:
determining an amount of a first increment to be applied to a first gain to interference plus noise ratio (GINR) corresponding to the one code word transmission; and
determining based at least in part on the first GINR, at least one of a modulation and coding level to apply to the one code word; and
in a second loop and a third loop used for the first data transmission, when the first data transmission is a two code word transmission:
determining an amount of a second increment to be applied to a second GINR corresponding to a first of the two code words;
determining based at least in part on the second GINR, at least one of a modulation and coding level to apply to the first of the two code words;
determining an amount of a third increment to be applied to a third GINR corresponding to a second of the two code words; and
determining based at least in part on the third GINR, at least one of a modulation and coding level to apply to the second of the two code words.

6. The method of claim 5, wherein, when the first increment is not updated for a predetermined period of time, the first increment is updated with an average of the second and third increments.

7. The method of claim 5, wherein, when the second and third increments are not updated for a predetermined period of time, the second and third increments are updated with the first increment.

8. The method of claim 1, wherein the second outer loop adjustment process includes, when the second data transmission is one of a one code word and two code word transmission:
determining an amount of an increment to be applied to a gain to interference plus noise ratio (GINR); and
determining based at least in part on the GINR, at least one of a modulation and coding level to apply to the second data transmission.

9. A network node configured to perform link adaptation, the network node comprising:
processing circuitry including a memory and a processor;
the memory configured to store a channel quality measure, gain increment values, and a hysteresis value;
the processor configured to:
compare the channel quality measure to a first predetermined amount; and
when the channel quality measure is greater than the first predetermined amount, perform a first outer loop adjustment process, the first outer loop adjustment process directed to determining link adaptation for a first data transmission transmitted to a wireless device, wherein the first outer loop adjustment process comprises three loops; and
when the channel quality measure is less than a second predetermined amount, perform a second outer loop adjustment process, the second outer loop adjustment process directed to determining link adaptation for a second data transmission to the wireless device,
wherein the second outer loop adjustment process comprises a single loop, and
wherein the first data transmission is two code words and the first outer loop adjustment process uses a first increment to adjust a first gain to interference plus noise ratio (GINR) and uses a second increment to adjust a second GINR.

10. The network node of claim 9, wherein the second outer loop adjustment process converges faster than the first outer loop adjustment process.

11. The network node of claim 9, wherein the first data transmission is one code word and the first outer loop adjustment process uses a first increment to adjust a gain to interference plus noise ratio (GINR).

12. The network node of claim 9, wherein the first data transmission is N code words, N being an integer greater than 2, the first outer loop adjustment process using a different increment to adjust a gain to interference plus noise ratio for each of the N code words.

13. The network node of claim 9, wherein the first outer loop adjustment process includes:
in a first loop used when the first data transmission is a one code word transmission:
determining an amount of a first increment to be applied to a first gain to interference plus noise ratio (GINR) corresponding to the one code word transmission; and determining based at least in part on the first GINR, at least one of a modulation and coding level to apply to the one code word; and in a second loop and a third loop used when the first data transmission is a two code word transmission:

determining an amount of a second increment to be applied to a second GINR corresponding to a first of the two code words; and determining based at least in part on the second GINR, at least one of a modulation and coding level to apply to the first of the two code words; and determining an amount of a third increment to be applied to a third GINR corresponding to a second of the two code words; and determining based at least in part on the third GINR, at least one of a modulation and coding level to apply to the second of the two code words.

14. The network node of claim 13, wherein, when the first increment is not updated for a predetermined period of time, the first increment is updated with an average of the second and third increments.

15. The network node of claim 13, wherein, when the second and third increments are not updated for a predetermined period of time, the second and third increments are updated with the first increment.

16. The network node of claim 9, wherein the second outer loop adjustment process and includes, when the second data transmission is one of a one code word and two code word transmission:

determining an amount of an increment to be applied to a gain to interference plus noise ratio (GINR); and determining based at least in part on the GINR, at least one of a modulation and coding level to apply to the second data transmission.

17. A method in a wireless communication system for performing link adaptation, the method comprising:

operating a first outer loop to determine link adaptation for a first code word based on a first gain increment during one of one code word transmission and a first code word transmission of a two code word transmission, wherein the first outer loop adjustment process comprises three loops;

incrementing a first gain to interference plus noise ratio (GINR) by the first gain increment and determining based at least in part on the incremented first GINR at least one of a modulation and coding level to apply to data to be transmitted on a first code word; and operating a second outer loop to determine link adaptation for a second code word based on a second gain increment during two code word transmission, the first outer loop converging faster than the second outer loop.

18. The method of claim 17, further comprising incrementing a second gain to interference plus noise ratio (GINR) by the second gain increment and determining based at least in part on the incremented second GINR at least one of a modulation and coding level to apply to data to be transmitted on a second code word.

19. The method of claim 17, wherein adjustment in the first outer loop is based on hybrid automatic repeat request (HARQ) feedback for the first code word during one of one and two code word transmission and adjustment in the second outer loop is based on HARQ feedback for the second code word during two code word transmission.

20. The method of claim 17, wherein the first gain increment is selected to track channel conditions for both one code word and two code word transmissions when a signal to interference plus noise (SINR) is less than a threshold.

21. A network node configured to perform link adaptation, the network node comprising:

processing circuitry including a memory and a processor;

the memory configured to store gain increment values; and the processor configured to:

operate a first outer loop to determine link adaptation for a first code word in the first outer loop based on a first gain increment during one of one code word transmission and a first code word transmission of a two code word transmission, wherein the first outer loop adjustment process comprises three loops;

increment a first gain to interference plus noise ratio (GINR) by the first gain increment and determine based at least in part on the incremented first GINR at least one of a modulation and coding level to apply to data to be transmitted on a first code word; and operate a second outer loop to determine link adaptation for a second code word in the second outer loop based on a second gain increment during two code word transmission, the first outer loop converging faster than the second outer loop.

22. The network node of claim 21, further comprising incrementing a second gain to interference plus noise ratio (GINR) by the second gain increment and determining based at least in part on the incremented second GINR at least one of a modulation and coding level to apply to data to be transmitted on a second code word.

23. The network node of claim 21, wherein adjustment in the first outer loop is based on hybrid automatic repeat request (HARQ) feedback for the first code word during one of one and two code word transmission and adjustment in the second outer loop is based on HARQ feedback for the second code word during two code word transmission.

24. The network node of claim 21, wherein the first gain increment is selected to track channel conditions for both one code word and two code word transmissions when a signal to interference plus noise (SINR) is below a predetermined threshold.

25. The method of claim 1, wherein the first predetermined amount is a threshold plus a hysteresis value and the second predetermined amount is the threshold minus the hysteresis value.

26. The network node of claim 9, wherein the first predetermined amount is a threshold plus a hysteresis value and the second predetermined amount is the threshold minus the hysteresis value.

* * * * *